United States Patent [19]

Hilbrands

[11] 4,002,051
[45] Jan. 11, 1977

[54] METHOD FOR DETERMINING THE BEHAVIOR OF A SHOCK ABSORBER OF A MOTOR VEHICLE ARRANGED IN THE WHEEL SUSPENSION AND A JIG FOR PERFORMING THE METHOD

[75] Inventor: Jan Willem Hilbrands, Hattingen, Netherlands

[73] Assignee: Maschinenfabrik Koppern & Co., KG, Germany

[22] Filed: Dec. 24, 1974

[21] Appl. No.: 536,178

[30] Foreign Application Priority Data

May 18, 1974 Germany .......................... 2423978

[52] U.S. Cl. .................................................. 73/11
[51] Int. Cl.² .......................................... G01M 17/04
[58] Field of Search ........................................ 73/11

[56] References Cited

UNITED STATES PATENTS

| 3,439,761 | 4/1969 | Laimins ...................... 73/141 A X |
| 3,486,369 | 12/1969 | Korzilius ..................... 73/141 A X |
| 3,690,145 | 9/1972 | Brisard ................................ 73/11 |
| 3,815,404 | 6/1974 | Brisard ................................ 73/11 |
| 3,855,841 | 12/1974 | Hunter ................................ 73/11 |
| 3,902,352 | 9/1975 | Buzzi ..................................... 73/11 |

Primary Examiner—Charles A. Ruehl
Attorney, Agent, or Firm—Craig & Antonelli

[57] ABSTRACT

A method and apparatus for determining the behavior of a shock absorber arranged in a wheel suspension unit within the sprung-mass-system of a vehicle. The method includes measuring the static wheel load, causing the wheel to vibrate by applying forces to the wheel according to a predetermined relationship of amplitude or stroke to frequency, measuring at least one of the minimum and maximum value of the vertical contact force supplied by the wheel to a support surface while subjecting the wheel to such applied forces as an indication of the minimum and maximum wheel load, respectively. The measured minimum or maximum wheel load is then divided by the static wheel load so as to form a dimensionless factor which serves as an indication of the usability of the shock absorber. The apparatus includes devices for vibrating the wheel, measuring the necessary values and providing an indication of the dimensionless factor.

16 Claims, 7 Drawing Figures

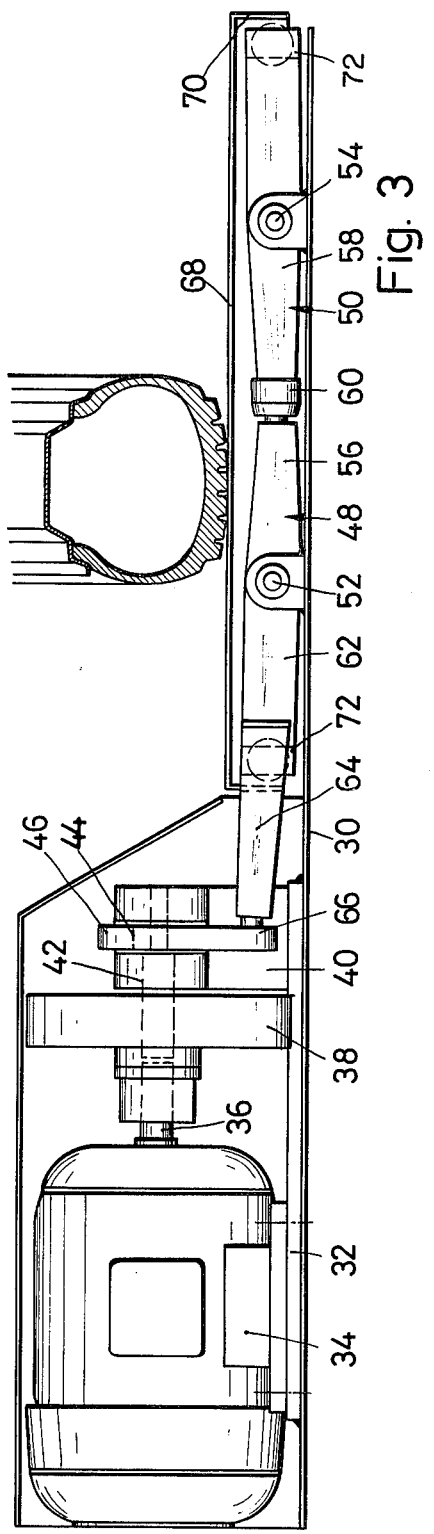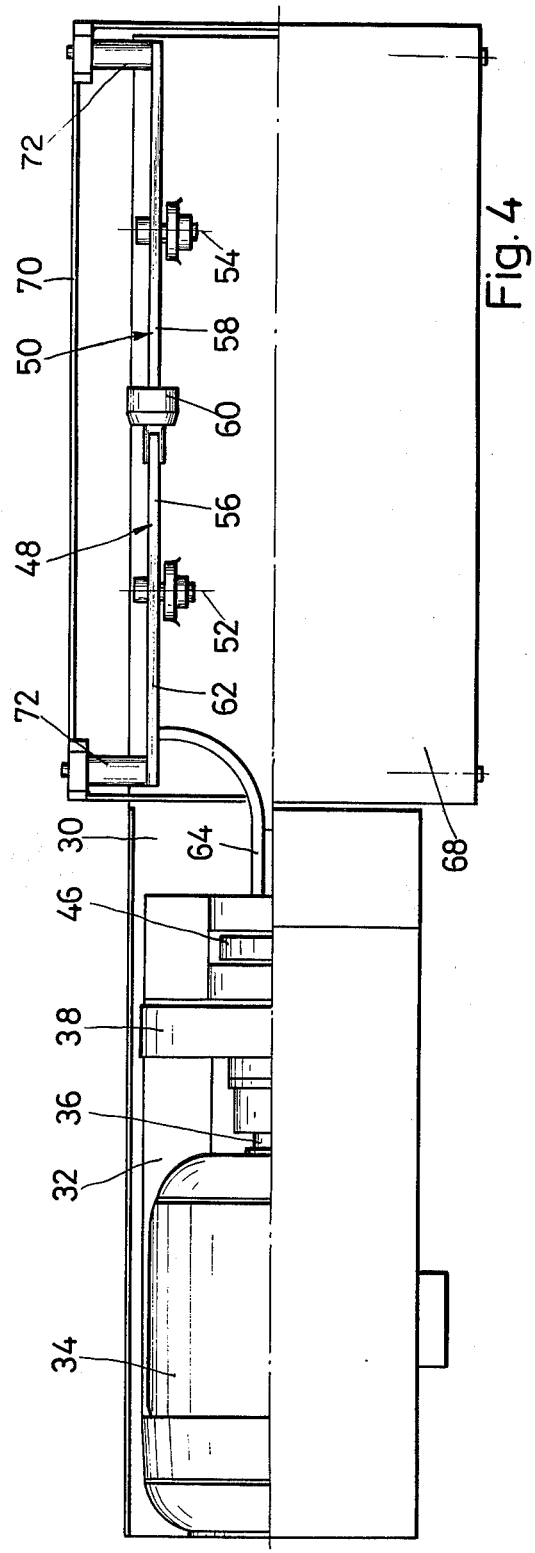

METHOD FOR DETERMINING THE BEHAVIOR OF A SHOCK ABSORBER OF A MOTOR VEHICLE ARRANGED IN THE WHEEL SUSPENSION AND A JIG FOR PERFORMING THE METHOD

The invention concerns a method for determining the behaviour of a shock absorber in the sprung mass system of a motor vehicle, by which the wheel is periodically subjected to shocks according to a stroke-frequency-diagram from its support surface, of which the resonance range is run through, the vertical wheel load measured and the minimum wheel load as criterion for the serivceability of the shock absorber and the quality, respectively, of the side guidance of the motor vehicle is worked up, as well as a jig for the performance of the method.

The task of the present invention is to further develop this method and the apparatus for the performance of the method, particularly to ascertain criteria, by which it is possible independent of the weight of a motor vehicle to make objective statements concerning the condition of the shock absorber and its behaviour in the wheel suspension, respectively, and a simple jig for the performance of the method.

This task is solved according to the invention in the manner that by division of the minimum, or the maximum wheel load by the static wheel load, a dimensionless factor is formed, which forms a criterion for the usability of the shock absorber in the wheel suspension.

The dimensionless factor ascertained in accordance with the present invention illustrates an objective indication of quality concerning the shock absorber and is independent of the weight of the motor vehicle and the absolute wheel load of the wheel suspension to be tested. Consequently it is possible for the first time by determination of a predetermmined range for the dimensionless factor, which in a simple manner can be indicated directly in a calculating machine, also to trust inexperienced workers with the testing of shock absorbers in the wheel suspension of motor vehicles.

The dimensionless factor can be formed according to the formula:

$$0 \leq F = \frac{R \text{ min.}}{R \text{ stat.}} \leq 1$$

On the other hand it is possible to form the dimensionless factor according to the formula:

$$1 \leq F' = \frac{R \text{ max.}}{R \text{ stat.}} \leq \infty$$

The factor $F'$ formed by use of the maximum wheel load has the advantage that the maximum wheel load lies absolute in the nominal range of a measured quantity transmitter which is provided for the static load. The maximum wheel load and the static wheel load permit to be measured with approximately equal precision. The rest wheel load or minimum wheel load can to the contrary become small in comparison to the static wheel load and lie outside of the nominal range of the measured valve transmitter. Therefore, for the measuring of the rest or minimum wheel load, it must be estimated, under circumstances, with considerable errors.

The method, in a further development according to the present invention provides reliable statements and measured quantities, if once during the testing a measuring range is performed in which the resonance frequency is contained.

In order to achieve reproduceable results, the wheel is subjected to shocks with constant stroke, preferably a stroke of about 6 mm.

The jig according to the present invention is of the type having a platform constituting a wheel supporting surface, which is vertically moveable with an oscillation generator and with which the force absorber or load-responsive transducer is provided between the oscillation generator and the platform. Starting from this known jig, in accordance with the present invention it is provided, that rectangular shaped frames are provided as the force absorber, which have parallel in the installation position two substantially vertical sides on which the securing means are applied, while the two remaining sides in the installation position which are essentially horizontal carry two measured quantity transmitters symmetrically disposed on the inner surfaces, respectively, of the horizontal sides, the transmitters preferably being strain gauge strips.

Preferably the platform is formed as a flat case with the walls directed therebelow, whereby the force absorbers, respectively, in accordance with the present invention are arranged in the range of the corners. A particularly low height embodiment, which makes the use of platforms essentially superfluous, has two pivot lever pairs with horizontal pivot axes, by which, respectively, two lever arms of each lever pair are pivotally connected to each other, and the other lever arms, respectively, in the range of their ends are connected with the force absorber, whereby on, respectively, each lever arm, there is secured a connection to the oscillation generator.

As an oscillation generator there can be provided in a per se known manner, an electromotor with a disc fly-wheel and a crank device, the connecting rod of which is swingably connected with a drive arm, which is fastened on both of the lever arms. Preferably the crank of the crank device is coaxially arranged with the motor axle.

The pivot connections between the lever arms connected to each other, the lever arms and the force absorber as well as the connecting rod and the drive arm are preferably formed as ball and socket joints.

By an advantageous embodiment of a testing stand, which has for each vehicle track a support platform connected with an oscillation generator, the platforms in accordance with the invention can be offset with respect to each other, respectively, in the longitudinal direction of the vehicle and a centering means can be provided for the vehicle wheel of the one track which crosswise to the vehicle is arranged flushly aligned with the platform of the oscillation generator for the isoaxle wheel of the other track, the centering means being provided in front of and behind, respectively, the platform. As centering means there can be provided for this, advantageously two rods or beams arranged spaced apart from each other crosswise to the track.

A jig for preformance of the method in accordance with the invention is examplewise illustrated in the drawing, and in the following, is described particularly with respect to the drawing.

FIG. 3 shows in side view, partially cut, an oscillation generator and vibrator, respectively, for the performance of the method in accordance with the present invention.

FIG. 4 shows, again partially cut, a plan view of the arrangement according to FIG. 3.

FIG. 7 shows a block diagram arrangement of a measuring system according to the present invention.

Figure 1:
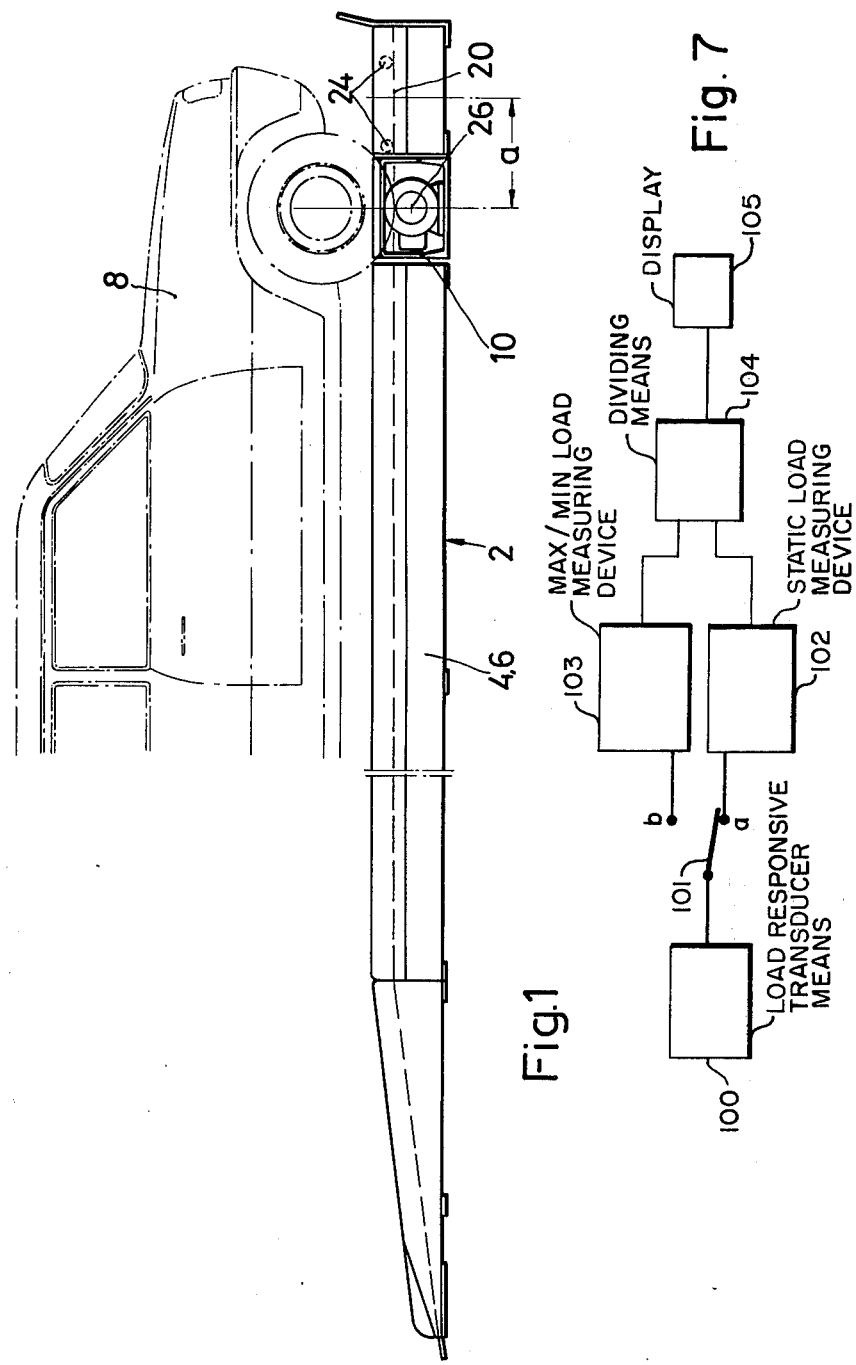
FIG. 1 shows a view of a testing stand.
Figure 2:
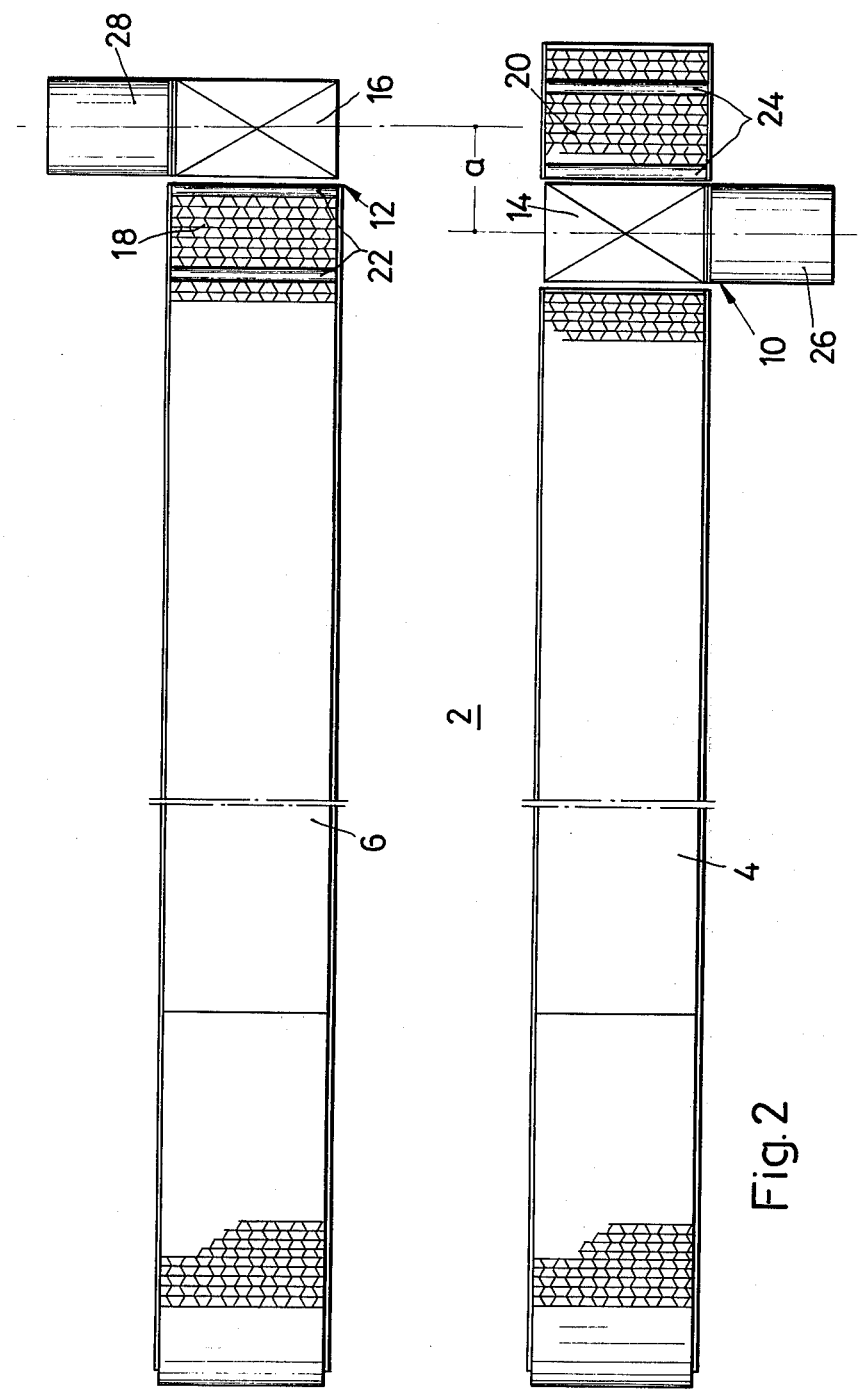
FIG. 2 shows a plan view of a test stand according to FIG. 1.

FIGS. 1 and 2 shows a test stand with two parallel ramps 4, 6. The two ramps 4 and 6 form the two wheel tracks for the wheels of the motor vehicle 8, the shock absorber of which is to be tested. In the two tracks there is provided, respectively, an oscillation generator or a vibration drive 10, 12. These vibration generators have a wheel supporting plate 14, 16, the width of which is equal to the width of the ramps 4 and 6, respectively. As evident from FIG. 2, both of the vibration drives 10 and 12 are offset with respect to each other in the longitudinal direction, respectively, by a distance a. Crosswise to the two ramps, therewith lying opposite the drives 10 and 12, respectively, are fixed support surfaces 18, 20. The two support surfaces are respectively provided with means for centering the wheel, which is isoaxle with the wheel, which respectively is arranged on the plate of the vibration drive in the opposite ramp. For a wheel centering of this type, as illustrated in the drawing, crosswise lying tubes 22, 24 can be provided, which tubes are arranged respectively at a distance from each other.

By both of these tubes, the wheel on the wheel support plate of the oscillation generator or vibration drive in the opposite ramp is substantially trued, i.e. centered.

Both of the vibration drives 10 and 12, respectively, have an electric motor 26, 28 with fly-wheel. For absorbers e.g. load-responsive tranducers are provided between the vibration drive and the wheel engaging plate or platform, by which force absorbers the respective wheel contact force is measured. Vibration drives are preferably provided for a constant stroke.

For testing, the vibration drive is brought to a frequency, which lies at the upper part of the resonance frequency of the sprung mass system of the wheel suspension system of the conventional motor vehicles. After switching the motor off, the vibration drive is damped by the sprung mass system of the wheel suspension system with the tire, the spring and the shock absorber. The minimum wheel contact force which occurs during the test and which is measured is decisive for the determination of whether a shock absorber is still usable, the wheel contact force being the minimum wheel contact force at the resonance frequency.

For the measurement of the wheel contact force, initially the motor vehicle preloads the platform of the vibration drive with a force dependent on the weight of the vehicle, namely the static wheel load which may be measured by device 102 in FIG. 7. The minimum wheel load at the resonance frequency is generally in behaviour small for static wheel loads and lies already, at values of 10% of the static wheel load, outside of the nominal rated range of conventional measured value transmitters, for example of strain gauge strips, which are provided for the static wheel load.

This means that the measured quantity transmitter must measure the minimum wheel load to be determined in the range of a relatively large measurement error. This difficulty can originate from the fact that wheel load variations between maximum and minimum wheel load lie essentially symmetrical to the static wheel load, thereby it is avoided that instead of the minimum wheel load, the maximum wheel load is measured and from the maximum wheel load and the static wheel load under consideration of the symmetry conditions of the wheel load variations, the minimum wheel load is calculated. Since the maximum wheel load for a minimum wheel load = 0 amounts to only double of the minimum wheel load, the static and the maximum wheel load are able to be measured substantially with the same precision. This occurs particularly if the center of the nominal range of the measured quantity transmitter is selected such that it lies in the range between the static and the maximum wheel load. The maximum and/or minimum wheel load may be measured by device 103 in FIG. 7.

The respective allowed minimum wheel load which is a criterion for the driving safety is dependent on the vehicle and consequently is different for vehicles of different empty weights.

This disadvantage can be overcome in the manner that from the measured wheel loads a dimensionless factor is formed, which is an independent criterion from the absolute size of the static wheel load, thus essentially from the empty weight of the vehicle, being a criterion for the condition of the wheel suspension, thus the cooperation of the tires, spring and shock absorber, and consequently the driving safety of the vehicle.

This dimensionless factor can be developed from the formula:

$$0 \leq F = \frac{R \text{ min.}}{R \text{ stat.}} \leq 1$$

where $R$ min. is the minimum wheel load and $R$ stat. is the static wheel load and F is the dimensionless factor.

It is yet also possible to develop the dimensionless factor according to the formula:

$$1 \leq F' = \frac{R \text{ max.}}{R \text{ stat.}} \leq \infty$$

where $R$ max. is the maximum wheel load and $F'$ is the dimensionless factor.

Because, as set forth above, it is possible to measure easier the maximum wheel load with the required exactness, in practice preferably the dimensionless factor is found by the second formula.

From the second formula it results that with a maximum wheel load which corresponds to double the static wheel load, the minimum wheel load becomes 0. This means again that when F' equals 2, that no contact force is present between the tires and the road. In order to guarantee a safe driving behaviour, for an efficient functioning wheel suspension, the factor F' must be smaller than 2. By means of test, it was determined that with vehicles of a series with a constant stroke of 6 mm, the factor F' is smaller than 1.7. A limiting value of this factor could be determined by agreement on the basis of a series of tests.

By the first formula, the factor $F = 1$ would mean that no variation of the wheel load occurred under the applied oscillations. The smaller this factor is, also the smaller is the minimum wheel load. A limiting value could here be established in the lower range, for example, 0.2 or 0.3.

The mentioned stroke of 6 mm leads, at the resonance frequency of the sprung mass systems of the wheel suspensions of normal motor vehicles to a relative speed between pistons and piston rods of a shock absorber of the order of 0.6 m/sec. The relative speed therefore lies in the neighborhood of the statistical average of 0.5 m/sec., of which is started out with the construction of shock absorbers.

While it is purposeful for routine examinations to operate the vibration drive with a predetermined amplitude, it can be purposeful and necessary for scientific examinations and development work also to make the stroke variable. With this, corresponding to the main application, determined stroke profiles can be provided and taken as a basis of the testing.

The factors $F$ and $F'$, respectively, permit electronic calculation from the values given off by the measured quantity transmitter and direct digital indication. For routine examinations of motor vehicles by the authorized motor vehicle inspection stations, it can also suffice to provide a simple Yes-No-indication with a pre-given limiting value. In this way the examiner is no longer required to note the limiting value. With digital indications by all means it would be possible on exceeding of the limiting value, thus indicating an unserviceable shock absorber, to provide a corresponding additional indication.

Obviously analogue indications are possible. With an indicator or pointer device, an illustration of the tolerance field is permitted, and it is simultaneously visible from the analogue indication at which distance the rated condition lies from the pregiven limiting value.

With the method according to the invention also the tires enter into the measuring result. It was established that the same sprung mass systems, thus the same wheel suspensions with built-in shock absorber, lead to different values in dependency on the type of the tires and the air-pressure of the tires. For the testing, it is important that the tires have the prescribed air pressure, so that the air pressure also enters as a constant degree of influence in the test results. With the method according to the invention, in other respects it is directly verifiable, if with an exchange of the tire type, for example during a change over from diagonal tires to belted-type or radial tires, an improvement or worsening of the driving characteristics are produced.

In FIGS. 3 and 4 there is illustrated an oscillation generator for performing of the method of the invention which is distinguished by a small overall height and which therefore requires only a very small and short drive-on and drive-off ramp and is mounted in a relatively shallow pit, respectively.

A motor foundaton 32 is secured to a ground plate 30, on which foundation 32 a motor 34 is arranged, on the drive shaft 36 of which an flywheel 38 is arranged.

In a particular bearing stand 40, there is rotatably mounted a crankshaft 42 with a crank pin 44. The rotation axis of the crank shaft 42 is coaxial with that of the motor 34. The crank throw 46 is mounted on the crank pin 44. Further, two pairs of double-armed levers 48 and 50 are arranged on the ground plate 30, of which levers only one pair is illustrated in FIG. 3. The double-armed levers are swingably mounted in pivot joints 52, 54, at which the bearing pins of both of the lever pairs are flush in alignment with each other. The arms 56 and 58, which are directed on each other, are connected with each other by means of a joint 60, which preferably is formed as a ball and socket joint. An actuating arm 64 is secured on the two arms 62 of the double armed levers 48, which arms 62 are directed toward the motor 34. The end of the actuating arm 64 by means of a joint 66, which again preferably is formed as a ball and socket joint, is connected with the lower end of the crank throw 46.

The two pairs of double-armed levers are overlapped by a platform 68 which is formed boxed-shaped with walls 70 directed beneath. The walls 70 laterally overlap the part of the drive lying under the platform 68. In the four corners of the platform 68, force absorbers or load-responsive transducers 72, are arranged, the shape of which will be described further below. These force absorbers are secured at the same distance from the pivot joints 52, 54 on the free arms of the levers 48 and 50. On the other hand, they are rigidly connected with the platform and indeed in the illustrated embodiment example respectively with the walls 70 of the platform 68 which lie parallel to the motor axis. Of the two connections of the force absorber, one is rigid and inflexibly formed, while the other is formed as a joint, for example again as a ball and socket joint.

Instead of the ball and socket joint also usual rubber joints may be used and indeed also for the pivot joints 52 and 54. These rubber joints should radially have a high rigidity. With the illustrated embodiment example, indeed there occurs absolutely measured distance variations during the swinging movement. Based on the ralatively long lever arms and the small required stroke, for example 6 mm, these distance variations however are relatively small and are able to be compensated by the customary tolerances, for example of the ball joints.

With an oscillation generator as illustrated in FIGS. 3 and 4, a wheel centering may be made on a side parallel to the platform, for example by utilizing two cross lying tubes. Since the two oscillation generators in the two tracks of the motor vehicle can be applied dislocated by 180°, with two equally formed oscillation generators, the wheel centering lies in the one track in front of the vibrating or oscillating platform and in the other track therebehind. It allows, thus, with a standard element without difficulty to produce an arrangement corresponding to FIG. 2.

With the samll overall height of platform 68 with the oscillation generator according to FIGS. 3 and 4 it is not necessary to bring the vehicle with its other axes to the same height. Provided that the platform is not sinkably arranged, therefore for a testing stand, besides two oscillation generators and two wheel stops merely one drive-up ramp and one drive-off ramp are required, which can be relatively short. The wheel centering with this, as desribed, can consist of one piece with the oscillation generator. It can yet also be formed of one piece with one of the ramps, whereby they then must be coupleable corresponding with the oscillation generator.

With fixed construction the wheel centering can be formed also by two tubes screwed on the floor, angle bars or the like.

Figure 5:
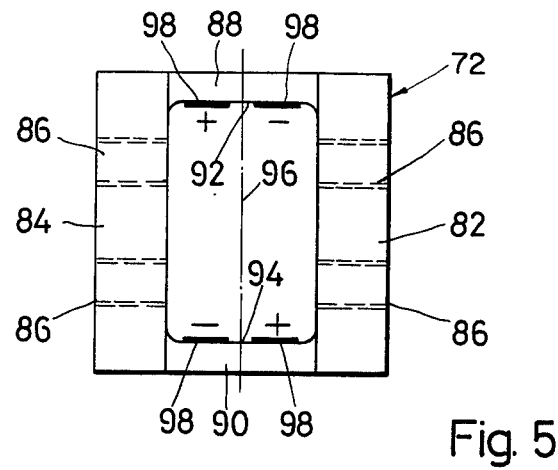
FIG. 5 shows an embodiment in accordance with the invention of a force absorber.

In FIG. 5 there is illustrated an especially advantageous embodiment of a force absorber for an apparatus for performance of the method in accordance with the present invention. The force absorber 72 is formed as a rectangular shaped frame with two parallel side walls 82 and 84. The walls 82 and 84 are formed rigid and are equipped with securing means, here illustrated threaded bores 86. Between the two walls 82 and 84, transverse walls 88 and 90 are provided, which have a pregiven elasticity. On the inner sides 92 and 94 of the walls 88 and 90, there are secured symmetrically to the center line 96, respectively, strain gauge strips 98 or similar measuring means. From the strain gauge strips there is given-off a signal dependent on the deformation of the walls 88 and 90 and thus dependent on the wheel load.

Figure 6:
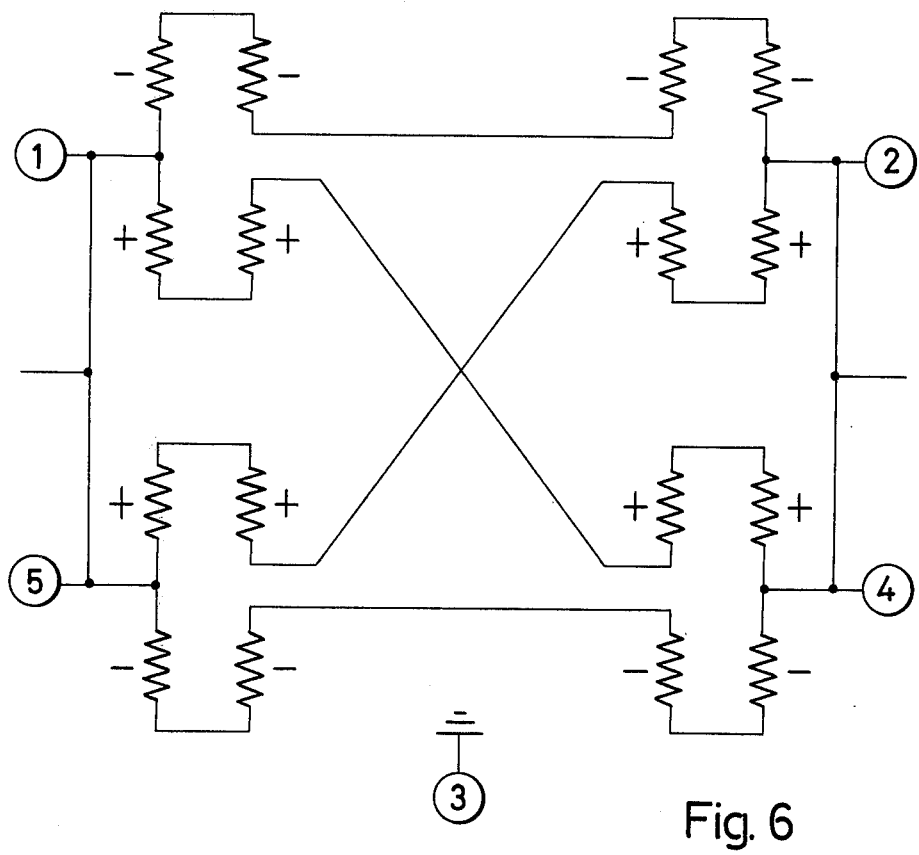
FIG. 6 shows the wiring of the force absorbers of an oscillation generator according to the FIGS. 3 and 4.

The wiring of the strain gauge strips of the four force absorbers, by which the platform 68 of the device according to FIGS. 3 and 4 is carried, is illustrated in FIG. 6. As evident from this drawing, respectively, two strain gauge strips of each force absorber are connected over, cross to the corresponding strain gauge strips of the diagonal opposite force absorber. In this manner a signal compensation is attained with unequal loading. The apparatus according to FIGS. 3 and 4 are consequently usable for motor vehicles with different track widths, since it does not matter that the supporting surfaces lie exactly symmetrical to the force absorber.

Yet once more in summary it is set forth that by means of the factors F and F', a criterion is produced for the driving behaviour of a wheel suspension in a vehicle, which is valid for all vehicle types independent of the empty weight and the construction of the wheel suspension. With all vehicles, the wheel looses its road traction, with $F = 0$ and $F' = 2$.

The cause for falling below and exceeding, respectively, of a limit value can lie in the tires or in the shock absorber. By observation of the pregiven conditions for the influence of the tires, errors in the shock absorber can be localized.

FIG. 7 shows a block diagram arrangement of the measuring system of the present invention wherein load-responsive transducer means 100 provide an output, for example, via switchable member 101. For static load measurement the output is supplied via contact $a$ of a static load measuring device 102 constructed in a manner known in the art. For measurement of the maximum and/or minimum wheel load the output is supplied via contact $b$ to a maximum/minimum load measuring device 103 constructed in a manner known in art. The outputs of devices 102 and 103 are then supplied to a dividing means for providing an output in accordance with the above-noted formulas to a display device 105.

I claim:

1. A method for determining the behaviour of a shock absorber arranged within a wheel suspension unit within the sprung-mass-system of a vehicle, comprising the steps of measuring the static wheel load, causing the wheel to vibrate by applying forces to the wheel according to a predetermined relationship of amplitude to frequency, measuring at least one of the minimum and maximum value of the vertical contact force applied by the wheel to a support surface while subjecting the wheel to such applied forces as an indication of the minimum and maximum wheel load, respectively, and forming a dimensionless factor serving as an indication of the usability of the shock absorber by dividing one of the minimum and maximum wheel loads by the static wheel load.

2. A method according to claim 1, wherein the dimensionless factor is formed according to the formula:

$$0 \leq F = \frac{R \text{ min.}}{R \text{ stat.}} \leq 1$$

wherein $F$ is the dimensionless factor, $R$ min. is the minimum wheel load and $R$ stat. is the static wheel load.

3. A method according to claim 1, wherein the dimensionless factor is formed according to the formula:

$$1 \leq F' = \frac{R \text{ max.}}{R \text{ stat.}} \leq \infty$$

wherein $F'$ is the dimensionless factor, $R$ max. is the maximum wheel load and $R$ stat. is the static wheel load.

4. A method according to claim 1, including applying forces in a cycle to include at least the resonant frequency of the sprung-mass-system.

5. A method according to claim 1, wherein the step of causing the wheel to vibrate by applying forces includes subjecting the wheel to applied forces with a constant stroke.

6. A method according to claim 5, wherein the wheel is subjected to applied forces with a stroke of approximately 6 mm.

7. Apparatus for determining the behaviour of a shock absorber arranged in a wheel suspension unit within the sprung-mass-system of a vehicle, comprising means for measuring the static wheel load, means for causing the wheel to vibrate by applying forces to the wheel according to a predetermined relationship of amplitude to frequency, means for measuring at least one of the minimum and maximum value of the vertical contact force applied by the wheel to a support surface while subjecting the wheel to such applied forces as an indication of the minimum and maximum wheel load, respectively, and means for dividing one of the minimum and maximum wheel loads by the static wheel load to form a dimensionless factor serving as an indication of the usability of the shock absorber.

8. Apparatus according to claim 7, wherein a platform serves as the wheel support surface, and said means for causing the wheel to vibrate includes an oscillation generator means for vertically moving the platform, the means for measuring the static wheel load and at least one of the minimum and maximum value of the vertical contact force including load-responsive transducer means arranged between the oscillation generator means and the platform.

9. Apparatus according to claim 8, wherein the load-responsive tranducer means includes rectangular shaped frames having in the installation position two parallel substantially vertical walls on which securing means are applied and two walls which are substantially horizontal, the substantially horizontal walls being provided with two symmetrically arranged strain gauge strips on the respective inner surfaces thereof.

10. Apparatus according to claim 9, wherein the platform is formed as a flat case with downwardly directed walls and the load-responsive transducer means are respectively arranged proximate to the corners of the flat case.

11. Apparatus according to claim 10, wherein the oscillation generator means includes an oscillating generator and two parallel pivotable lever pairs having horizontal axes, each lever pair having respectively two lever arms pivotally connected to each other and other lever arms respectively in the region of the end portions thereof connected with the load-responsive transducer means, one of the other lever arms of each lever pair being provided with a connection for the oscillating generator.

12. Apparatus according to claim 11, wherein the oscillating generator includes an electric motor having a disk fly-wheel and a crank device, the crank device having a connecting rod swingably connected with a drive arm which is fastened to the two lever arms.

13. Apparatus according to claim 12, wherein the crank device has the crank thereof arranged coaxially with the motor axis.

14. Apparatus according to claim 11, wherein ball joint means are provided for connecting the two lever arms of each lever pair.

15. Apparatus according to claim 11, wherein fixed pivot point means are provided for each lever pair, the fixed pivot point means of the two lever arms of one of the pair being in alignment with the respective fixed pivot point means of the other of the pair and spaced from one another at opposite positions with respect to an axis of a motor of the oscillation generator means.

16. Apparatus according to claim 9, wherein for every vehicle track, there is provided a supporting platform connected with one oscillating generator means, the respective platforms being offset relative to each other in the longitudinal direction of the vehicle and a centering means for the vehicle. wheel of the track is disposed transversely to the vehicle and arranged flushly aligned with the platform for the isoaxle wheel.

* * * * *